INVENTOR.
Fernando Falla

July 1, 1958 F. FALLA 2,841,125
STEAM BOILER WITH SUPERHEATER AND CONTROLS THEREFOR
Filed Dec. 23, 1954 4 Sheets-Sheet 3

INVENTOR.
Fernando Falla
BY
ATTORNEYS

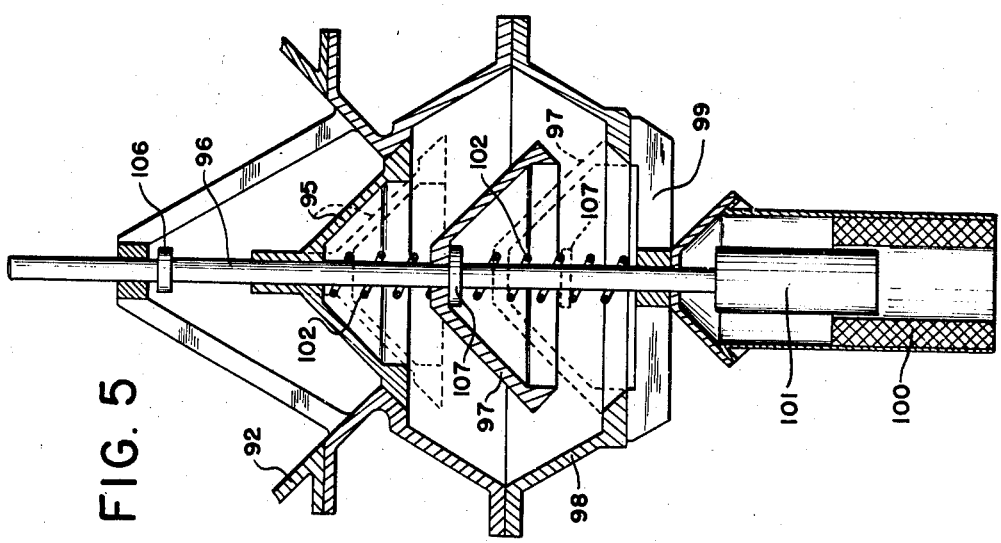
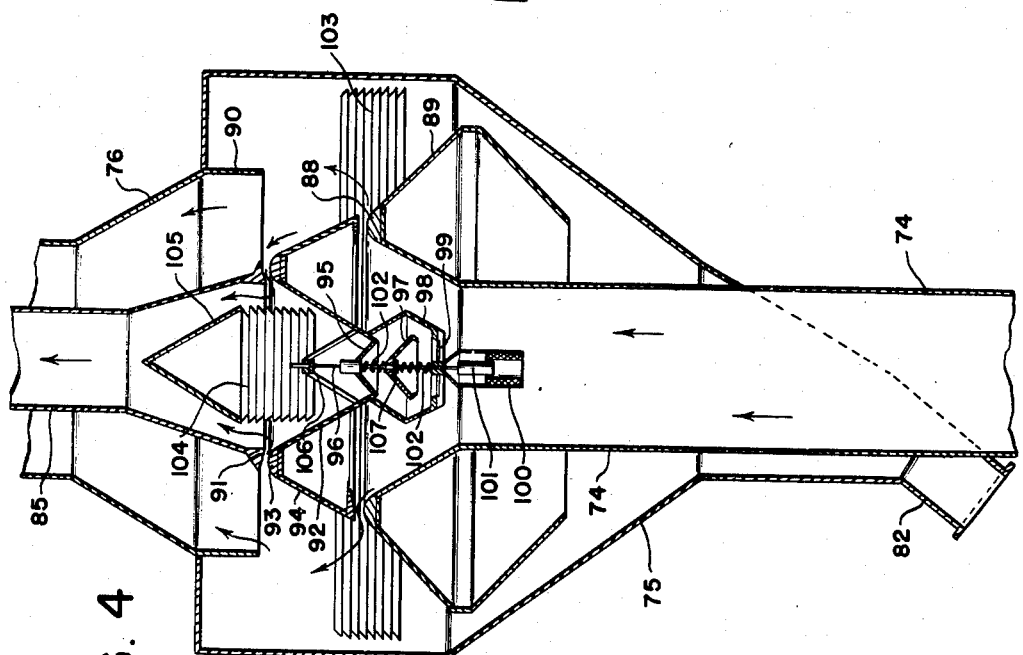
INVENTOR.
Fernando Falla

United States Patent Office 2,841,125
Patented July 1, 1958

2,841,125

STEAM BOILER WITH SUPERHEATER AND CONTROLS THEREFOR

Fernando Falla, Maplewood, N. J., assignor to Kennedy-Van Saun Mfg. & Eng. Corp., New York, N. Y., a corporation of Delaware Application December 23, 1954, Serial No. 477,227

8 Claims. (Cl. 122—479)

My invention relates to the conversion of inefficient steam generator power plants into installations with greatly improved efficiency.

At the present time, there are numerous power plant installations for the production of electricity scattered throughout the country which have an extremely low efficiency compared to that of recently built modern power plants. One of the problems involved is that of increasing the efficiency of the uneconomical steam generator power plants without discarding the power plant structures to an excessive extent.

Another problem is the conversion of fuel, coal, oil and gas. While there is an enormous reserve of coal which can be utilized in power plants, if properly processed, it is generally recognized that the reserves of petroleum oil and natural gas are uncertain for the future and will in time become depleted.

It is recognized that the owners of inefficient and uneconomical steam power plants cannot effectively compete with the owners of more modern plants because the uneconomical plants require from 12,000 to 14,000 B. t. u. to produce a kilowatt of electricity, whereas the more efficient modern plants require only from 9,000 to 10,000 B. t. u. to produce a kilowatt of electricity.

One solution to the problem of the uneconomical power plants would be to scrap them completely and build new plants. This, however, even if the new plants could be financed by the present owners of uneconomical plants, would result in an enormous waste of the present installations. This can be appreciated from the fact that it would cost approximately $200 per kilowatt for a completely new modern plant, whereas, according to the present invention, an uneconomical plant can be converted at a cost of approximately $70 per kilowatt.

The primary object of my invention is, therefore, to provide an improved method and system for converting uneconomical steam generator power installations into efficient economical installations.

A further object of my invention is to provide a method and system for converting inefficient and uneconomical steam power plants in such a way that considerable savings in fuel costs are achieved.

Another object of my invention is to provide an improved highly efficient steam power plant installation, in which the elements are coordinated in a novel and effective manner for the efficient utilization of fuel, particularly coal.

In accordance with the present invention an inefficient uneconomical power plant is converted and rebuilt by removing the present steam generating tubes, headers, steam and water drums and superheater, and replacing these elements, which are normally only capable of producing superheated steam, for example, at a pressure of 1400 or 1450 p. s. i. and 750° F., with corresponding elements capable of producing steam at 1800 to 2000 p. s. i. and 1050° F., or higher. It will be understood that other incidental equipment may also be replaced, such as pumps, valves and other parts which would be unsatisfactory for the higher pressures and temperatures.

Furthermore, where the uneconomical plant now includes two steam turbine generators in series, one for example operable at 1400 p. s. i. and 750° F., and a second operable, for example, at 400 p. s. i. and 750° F., the higher steam pressure unit is to be replaced by a new one operable, for example, at 1800 p. s. i. and 1050° F. steam. In this new system the high pressure superheated steam from the superheater is directed to the new high pressure and temperature turbine unit, the exhaust steam from which is sent through a reheater and delivered at approximately 400 p. s. i. to the present low pressure steam turbine generator unit at a temperature of, for example, 750° F. The converted installation, therefore, will include a reheater unit for the steam delivered by the high pressure turbine, as well as a novel temperature control system for the steam delivered to the lower pressure steam turbine, as described more in detail hereinafter.

Unless it is found to be more economical in a particular locality to burn oil or gas for firing the steam generator, the converted installation preferably includes a system for firing the steam generator with pulverized coal, although it may include means for firing with oil or gas. The coal system for firing comprises one or more air-swept tube mills for pulverizing the coal, means for feeding raw coal to the mill to be pulverized therein, means responsive to the rise and fall of the level of coal in the mill for respectively decreasing and increasing the rate of feed of coal by the feeding means to maintain a reserve supply of pulverized coal in the mill or mills. It has been found that the only really effective way to obtain proper pulverization of coal in the required quantity for a steam generator is to utilize an air-swept tube mill.

In the preferred reconstruction of the uneconomical steam generator installation, it is proposed to utilize existing foundations, supports, steel structure and superstructure and the power plant building as it presently exists, also reheaters, economizers, air heaters, complete equipment of surface condensers, low and high pressure feed water heaters, feed water evaporators, interconnecting pumps and piping, vacuum pump, circulating pump, condensate pump, thereby saving large sums of money in the reconstruction and conversion. The steam generator setting, however, is modified to the extent of providing upper and lower sets of pulverized coal burners, the normal installation requiring a plurality of lower burners and lesser number of upper burners. In this re-arrangement, it is proposed to locate the steam superheater in a position so that it will not receive direct radiant heat from either of the sets of burners, although the upper set of burners is provided more especially for controlling the temperature of the superheated steam.

In order to accomplish these results, and in a preferred construction and operation all of the combustion gases in the steam generator combustion chamber are passed over the steam superheater but the upper set of burners for controlling the temperature of the superheated steam is supplied with a superfine pulverized coal, which is finer than the coal supplied to the lower set of burners so that combustion is substantially complete at the outlets of the upper set of burners. The control of the superheated steam temperature directly in the superheater increases the efficiency of the installation because the superheater is never required to produce a higher temperature steam than that required by the high pressure and high temperature turbine. In other words, the uneconomical practice of using a desuperheater is avoided. The direct control of the temperature of the superheated steam therefore requires no extra power, such as that required in known types of control systems.

The conversion and rebuilding of existing uneconomical steam generator power plants in accordance with the present invention for increasing the efficiency and output, according to the invention, results in a considerable saving of steel and other building materials over the building of new plants. Furthermore, an existing plant can be converted in much less time than that required for constructing a new plant. These factors are extremely important, particularly in the case of national emergency.

The invention comprises other features, objects and advantages which are described more in detail hereinafter in connection with the accompanying drawings illustrating an embodiment of the invention and forming a part of this application.

In the drawings:

Fig. 4 is a vertical sectional view of one of the classifiers on an enlarged scale; and Fig. 5 is a broken vertical sectional view of a portion of the classifier shown in Fig. 4.

Figure 1:
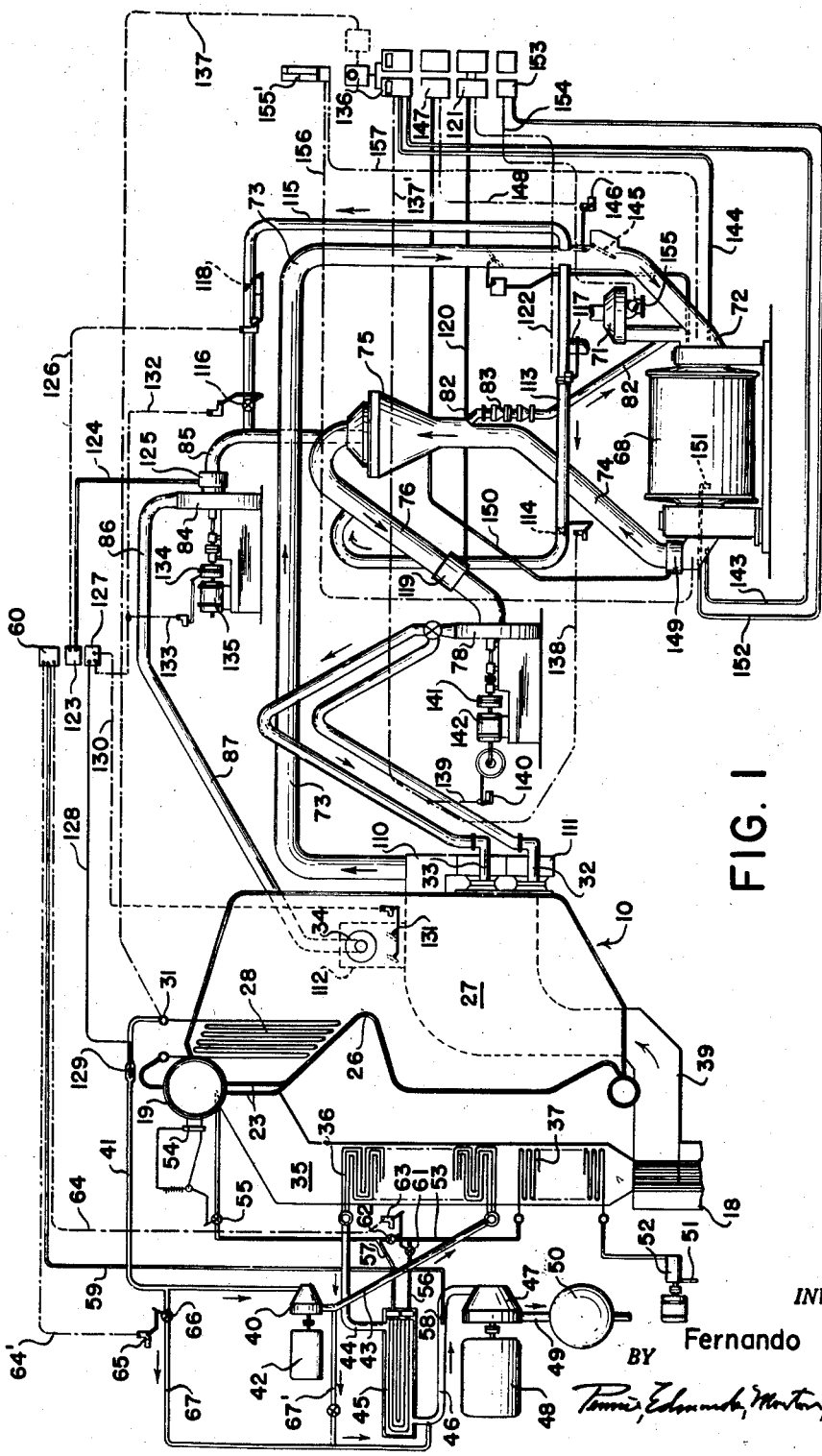
Fig. 1 is a diagrammatic side elevational view of a converted steam generator power plant installation incorporating the features of the present invention.

In the drawings certain parts are broken away or left out in order to simplify the showing and avoid confusion. Other parts are shown diagrammatically.

In order to illustrate the conversion and rebuilding of a steam generator power plant, reference will first be made to Fig. 3 of the drawings which shows more of the steam generator setting and wall structure than the other views of the drawings. To begin with, it is to be understood that the structural steel supports, foundation and wall structures will be retained as they are, except for minor modifications necessary for the installation of new equipment. For example, the steam generator 10 shown in Fig. 3 includes the refractory walls, as for example, the front wall 11, the roof wall 12, a back wall 13, ash traps 14 and 15 and walls 16 and 17 forming a recuperator chamber, all supported on the existing steel framework, not shown, carried on the existing foundation, not shown. The structure also includes an air preheater 18.

After the steam generator tubes, headers and steam and water drum are removed from the structure along with the superheater tubes, these various elements are replaced with high pressure equipment, including a steam and water drum 19 at the top of the installation, a water drum 20 extending across the lower part of the installation, upper headers 21 and lower headers 22 for the side wall tubes. The front and back walls are lined with steam generating tubes 23, the respective ends of which are connected into the drums 19 and 20. The inside of the side walls of the steam generator are each respectively covered with closely-spaced steam generating tubes 24 connected into a pair of upper and lower headers 21 and 22, the upper headers 21 being connected into the steam and water drum 19 by tubes 25. Downcomers, not shown, deliver water from the steam and water drum 19 to the headers 22 and water drum 20 in the usual manner, so that in a steaming operation the water delivered to the lower ends of the tubes 23 and 24 from the drum 20 and headers 22 flows upwardly through the tubes into the headers 21 and the steam and water drum 19, along with the generated steam.

It will be noted that the back wall 13 of the generator proper includes an inwardly curved portion 26 which slants upwardly and to the rear. The steam superheater is mounted above this sloping wall section so that it is shielded from the direct radiation from the burners in the combustion chamber 27 bordered by the wall tubes. The bank of tubes forming the superheater shown at 28 is comprised of high pressure tubes adapted to withstand high temperatures, these tubes being connected into an inlet header 29, connected by tubes 30 with the steam and water drum 19, and with an outlet header 31.

In reconstructing the steam generator setting in accordance with the illustrative embodiment shown in the drawings the front wall 11 was modified to accommodate four main burners comprising two lower burners 32 and two upper burners 33. The side walls were each modified to accommodate a burner 34 located above the main burners, below and to the front of the rear wall bend 26, but above the upper main burners 33. While the drawings show the uppermost burner 34 located on the side walls of the furnace, these burners may be located at approximately the same elevation but as a front upper row of burners at the front wall of the furnace, virtually making three rows of burners in the front wall, a row of burners 32, a row of burners 33 and a row of burners 34 above the row of burners 33.

Figure 3:
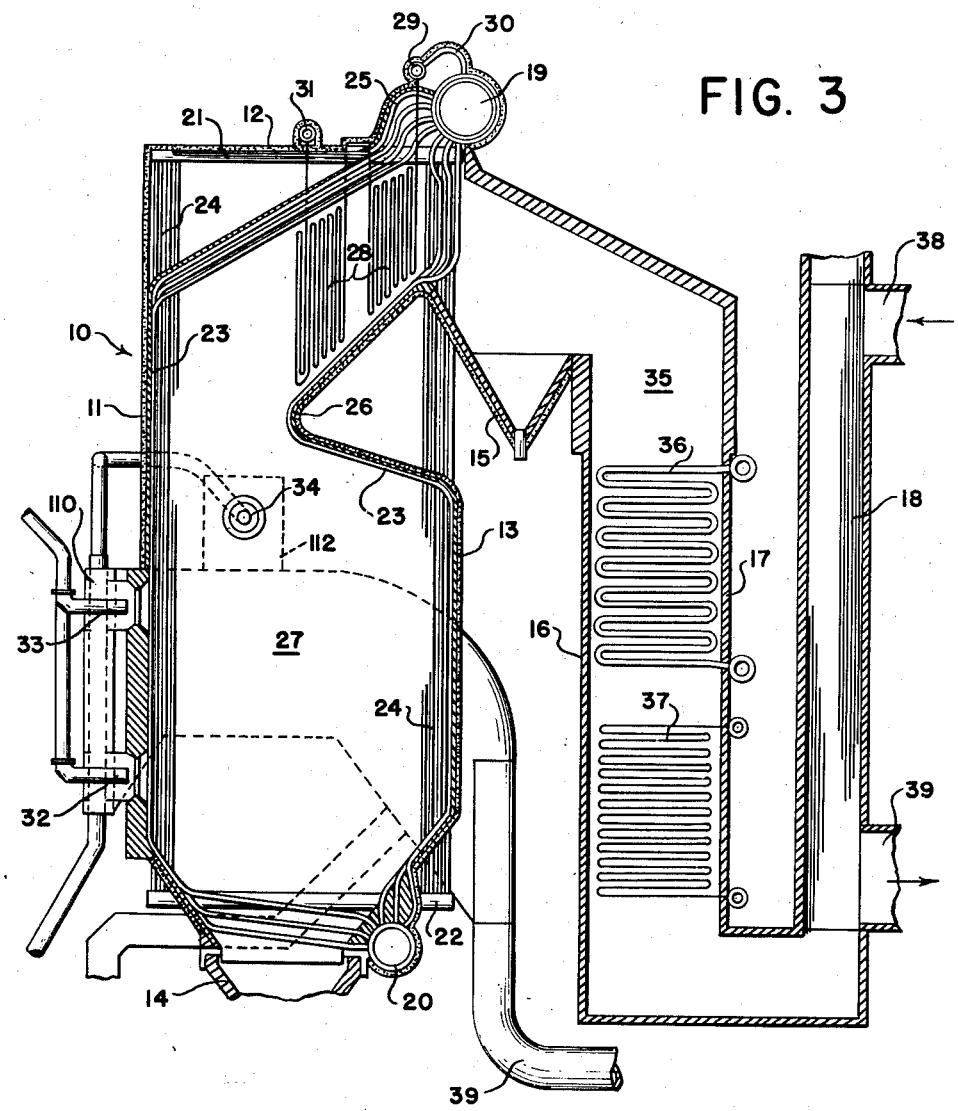
Fig. 3 is an enlarged side elevational view with parts broken away, of the steam generator structure shown diagrammatically in Fig. 1 taken from the opposite side.

In the steam generator shown in Fig. 3, the combustion gases passing over the superheater bank 28 pass downwardly through a recuperator chamber 35 formed by the walls 16 and 17. In converting the installation the superheated steam reheater tube bank 36 located above the recuperator tube bank 37 were both retained. The combustion gases pass downwardly over the banks 36 and 37 and through the tubes of the air preheater 18. Air to be preheated for the installation is delivered through an inlet 38 and discharged through an air outlet pipe 39.

Fig. 1 of the drawings shows the steam generator 10 diagrammatically, from the opposite side, with the new fuel supply equipment controls, and a new high pressure, high temperature steam turbine 40. This turbine is supplied with superheated steam from the header 31 through a line 41, and is coupled to and drives an electric generator 42. Steam exhausted from the steam turbine 40, still at a relatively high temperature and pressure, is conducted through a line 43 to the lower header of the reheater 36 in which the superheated steam is reheated and delivered from its upper header through a line 44 to a heat exchanger 45 and through a connecting line 46 to a steam turbine 47, which may be and preferably is the existing low pressure steam turbine of the original plant operable at an inlet temperature of about 750° F. and at a pressure of 400 p. s. i. This turbine drives an electric generator 48. The output of the generators 42 and 48 may be combined and connected into the power supply system. The steam exhausted from the steam turbine 47 flows through a pipe 49 into a vacuum condenser 50.

The arrangement of the steam turbines 40 and 47 in connection with the reheater 36 and heat exchanger 45 is such that the superheated steam delivered to the turbine 47 has approximately the correct pressure of the order of 400 p. s. i. However, in accordance with the invention, the temperature of the superheated steam exhausted from the turbine 40 through the line 43 may vary somewhat and normally has a temperature of only about 690° F., which is not sufficiently high for the 750° F. turbine 47. Accordingly, means is provided for controlling the temperature of the superheated steam exhausted from the turbine 40 and delivered into the turbine 47, this including the reheater 36, which is heated by flue gases leaving the superheater bank 28. It is apparent, therefore, that when the installation is operated at varying loads, or outputs of electricity from the generators 42 and 48, the temperature produced by the reheater 36 may vary considerably. Therefore, the superheated steam passed through the pipe 44 is delivered through the heat exchanger 45 where its temperature may be lowered by heat exchanged to the feed water to the desired extent before being delivered through the line 46 to the steam turbine 47. The temperature is lowered when the superheated steam delivered by the reheater 36 is appreciably above 750° F.

Instead of using a desuperheater of the kinds generally employed, the adjustment of the temperature of the superheated steam flowing to the steam turbine 47 is accurately controlled by utilizing necessary portions of the feed water being supplied to the steam generator. The water supply for the steam generator which will consist primarily of condensate, as for example, from the vacuum condenser 50 is conducted by a pipe 51 and a pump 52 to the bank of recuperator tubes 37 which are heated by combustion gases after passing over the reheater 36. The preheated feed water is delivered from the recuperator 37 through a pipe 53 to the steam and water drum 19 under the control of a liquid level controller 54 arranged to actuate a control valve 55 in the pipe 53. The heat exchanger 45 utilized for reducing the temperature of the superheated steam delivered through the pipe 44 is connected by inlet and outlet pipes 56 and 57, respectively, with the water supply pipe 53. Temperature responsive means 58, such as a thermocouple is located in the superheated steam line 46, and this instrument 58 is connected by suitable wiring or other equivalent means 59 with a temperature control mechanism 60, which actuates control valves 61 and 62 in pipes 56 and 53, respectively, through suitable actuating means 63 connected by wiring or other equivalent means 64 with the temperature regulator 60.

If, under certain load conditions, the temperature of the steam delivered to the steam turbine 47 through the line 46 tends to increase above approximately 750° F., the controller 60 operates the valve 61 toward open position and the valve 62 toward closed position, to a sufficient extent to produce the necessary flow of water through the heat exchanger 45 to bring the temperature of the superheated steam to the required 750° F., approximately. The regulator 60 is set to vary the flow of water with changes in steam temperature, and, therefore, if the temperature of the superheated steam in the line 46 should tend to fall appreciably below 750° F., the controller 60 in response to the instrument 58 acts to move the valve 61 toward closed position and the valve 62 toward open position.

Under normal conditions, the reheater 36 will be adapted to heat the steam from the line 43 to the required temperature, at least with the valve 61 closed, but if under some load condition the temperature in the line 46 is not sufficiently high, the regulator 60 acting through wiring 64' or other means energizes a valve actuator 65 associated with a control valve 66 in a superheated steam bypass line 67 connected into the superheated steam supply line 41 and the line 46. This action causes high temperature superheated steam to flow into the line 46 in sufficient amount to raise the temperature to that suitable for the turbine 47. The amount of superheated steam added in this way is usually relatively small, if any is added at all, and does not materially affect the pressure in the line 46, although the pressure in the supply line 41 is considerably higher.

Instead of reheating all of the steam exhausted from the turbine 40 in the reheater 36, the system may be operated by heating one half or less of the steam in the reheater, the remainder being directed from the line 43 through a valved bypass line 67' into the bypass line 67 connected into the line 46 and the steam turbine 47. The bypassing of a portion of the exhausted steam from the turbine 40 directly to the turbine 47 in this manner has certain advantages, particularly under some load conditions, since the over-all pressure drop between the turbines 40 and 47 will be somewhat less than as if all of the exhausted steam from the turbine 40 were passed through the reheater 36 and the heat exchanger 45. In this form of operation, the part of the steam heated in the reheater 36 will attain a higher temperature than when all of the steam is reheated, but its temperature will be reduced by the bypassed steam to the temperature for which the steam turbine 47 is designed. Under these conditions relatively small amounts of cooling water will be necessary in the heat exchanger 45.

In accordance with the invention and as stated above, the converted steam generator installation is provided with means for firing the steam generator with pulverized coal supplied in air streams delivered to the burners 32, 33 and 34. The means for producing the pulverized coal comprises one or more air-swept tube mills for grinding and pulverizing coal, the number of such mills depending on the size or capacity of the installation. In the present instance the installation is illustrated in connection with the use of two air-swept tube mills 68 and 68' which are operated in parallel. These mills are provided with the same equipment and, therefore, it will be necessary to describe the arrangement and functioning of only one mill except for a few minor instances.

Figure 2:
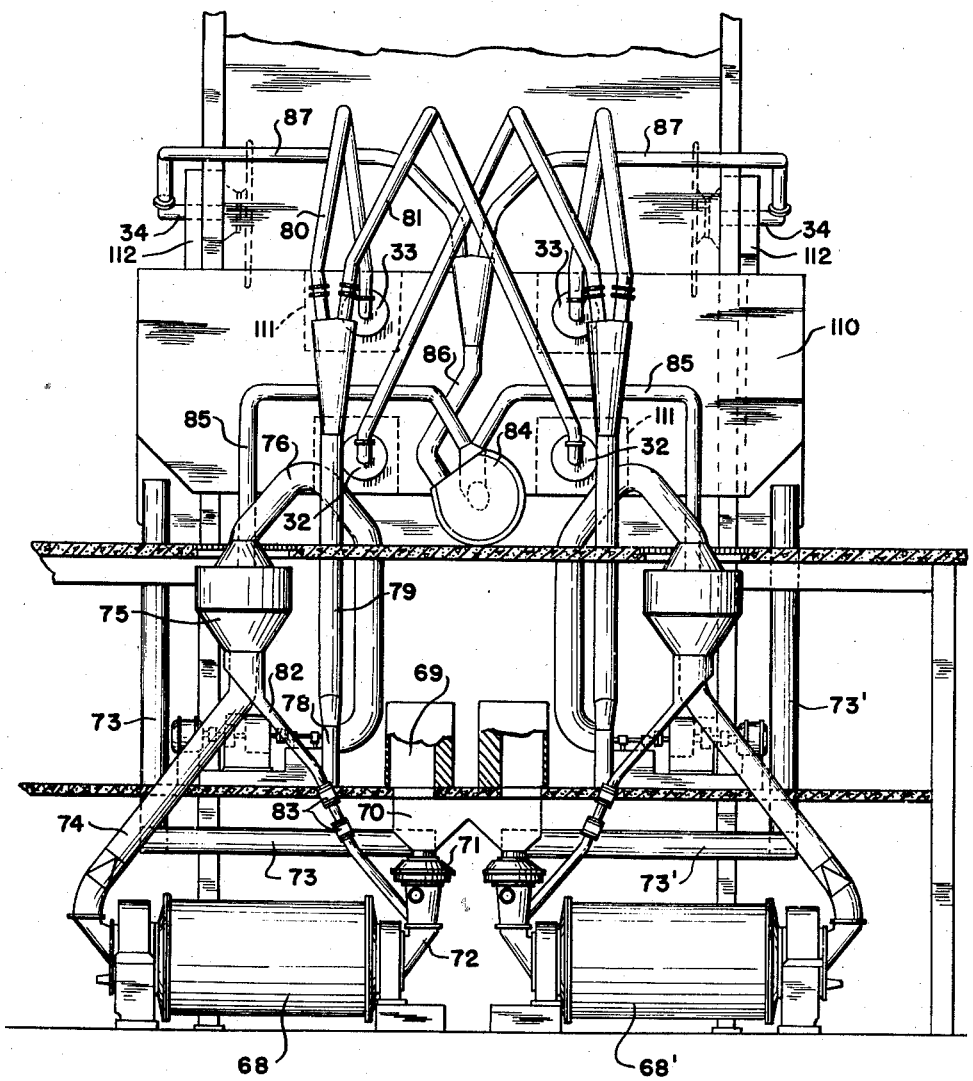
Fig. 2 is a diagrammatic front elevational view of the installation shown in Fig. 1.

Referring to Fig. 2 of the drawings, the coal to be pulverized in the rotary mills 68 and 68' is supplied from a coal bin at the front of the installation, not shown, through weighing scales, not shown, and, that for the mill 68 is delivered through an opening 69 into a hopper 70, which in turn delivers the coal to a disc feeder of known type 71 from which the coal to be pulverized is passed at a predetermined rate through an inlet chute 72 into the mill 68. At the same time hot air from the air preheater 18 is conducted from the duct 39 through various other ducting and passed through a duct 73 along with the coal into the inlet of the mill 68. As the coal is pulverized, the finely ground pulverized coal is picked up by the hot air stream, which substantially or completely dries the coal, and the resulting mixture is delivered through a duct 74 into a two-stage classifier 75. The duct 74 extends into the classifier 75, as shown in Fig. 4, and the pulverized coal remaining in the air stream from the first classification stage passes through a duct 76 connected into the intake of an exhauster fan 78 which serves to draw the air through the duct 73, and the pulverized coal and air mixture through the duct 74 and classifier 75. The pulverized coal and air mixture delivered by the exhauster fan 78 is conducted through a duct 79 and branch ducts 80 and 81, respectively, to one each of the upper and lower burners 33 and 32 at opposite sides of the installation. The other burners 32 and 33 are supplied with pulverized coal in a similar manner from the other mill 68'.

The relatively coarse pulverized coal separated in the first stage of classification flows from the classifier 75 through a return duct 82 provided with a check valve arrangement of known type 83, into the inlet chute 72, so that this material is reprocessed in the air-swept tube mill 68.

Since extremely fine pulverized coal is utilized in the burners 34, a second exhauster fan 84 is used to draw a mixture of air and such pulverized coal from the first classification stage of classifier 75, subjected to a second classification and withdraw it through a duct 85, the inlet end portion of which extends concentrically through a portion of the duct 76 into the classifier 75. The exhauster fan 84 draws a stream of extremely fine pulverized coal and air from the classifiers of both mill units. This combined stream is delivered to a duct 86 and passes through connecting branch ducts 87 to the respective burners 34, set in opposite sides of the combustion chamber 27 so that the outlets of the burners 34 are directed toward each other.

The two-stage classifier 75 has the novel construction shown more in detail in Fig. 4 in which it will be noted that the duct 74 extends into the body of the classifier and is flared outwardly in a funnel-like manner to provide an annular rim 88 to which is connected a skirt 89 which is flared outwardly in frusto conical form and then inwardly in a similar manner in spaced relation to the casing of the classifier. The duct 76 is expanded above the body of the classifier and includes a projecting apron 90 extending downwardly inside the casing of the classifier. The duct 85 extending concentrically through the inlet of the duct 76 is also flared outwardly and terminates in an annular rim 91 at about the level of the edge of the apron 90. An inverted cone-shaped section 92 having an annular rim 93 spaced slightly from the rim 91 is mounted between the ducts 74 and 85. The member 92 is provided with an outwardly flaring skirt 94, the lower edge of which is spaced slightly above the rim 88. The member 92 is provided with a central opening closable by a cone-shaped valve member 95 slidable on a movable armature shaft 96. This shaft carries a second cone-shaped closure 97 slidable on the shaft and adapted to close the central opening in a casing 98 forming a continuation of the member 92 and surrounding the closures 95 and 97. The armature shaft 96 is movable vertically in spiders 99, the lower of which carries an electromagnetic coil 100 through which an armature 101 on the the shaft 96 is adapted to move. Springs 102 arranged below the closure members respectively bias the shaft and the closure members upwardly so that the member 95 normally closes the opening in the lower part of the member 92.

When suction is applied in the duct 76, a stream of pulverized coal and air is drawn through the duct 74 into the classifier through the annular space between the rim 88 and the lower edge of the apron 94. This stream engages a series of annular louver plates 103 and separation of the coarser particles of the pulverized coal occurs. These separated particles slide down the casing of the classifier 75 into the duct 82. The suction applied by the exhauster fan 84 through the duct 85 causes a part of the stream of classified air-coal mixture to flow through the annular space between the rims 91 and 92 against a circular series of louver plates 104 arranged below a hollow cone 105. This action produces a separation of the coarser particles of the previously classified pulverized coal flowing through the annular opening between the rims 91 and 93, these coarser particles collecting on the closure member 95. The remaining mixture of air and extremely fine pulverized coal passes out through the duct 85 to the burners 34. In this arrangement, it will be noted that the mixture of pulverized coal and air subjected to the classification inside the member 92 is the result of a previous classification of a mixture flowing over the rim 88.

The pulverized coal collected on the conical closure member 95 is of a fineness which would normally be carried through the duct 76 and is, therefore, delivered directly into the outlet of the duct 74 so that it may be picked up by the stream of air and resubjected to the first stage of classification, most of which will be drawn into the duct 76. The discharge of the pulverized coal from the conical closure member 95 is effected by energizing the electromagnetic coil 100, which draws down the armature 101 and the armature shaft 96 downwardly to move the closure member 97, to closed position while the pulverized coal is flowing over the member 95 into the casing 98. The periodic operation of the electromagnetic coil 100 will serve to effect the desired results and at the same time prevent the flow of the air mixture directly from the duct 74 into the second stage classifying zone, since the closure 97 is closed when the closure 95 is opened and vice versa.

The arrangement of the closures or traps 95 and 97 is such that one of these traps is always closed so that fine coal particles cannot be blown back into the second stage of classification. As shown, the shaft carries a fixed ring 106 spaced above the trap 95 and a fixed ring 107 on which the trap 97 rests when open. When the solenoid 100 is energized, the initial portion of the stroke of the armature pulls the trap 97 down to closed position against the action of the lower spring. At the same time the upper spring expands to keep the upper trap 95 closed.

After the lower trap has been closed, the lower part of the stroke, when the ring 106 is against the hub of the trap 95, pulls that trap open. During the return stroke of the solenoid when it is de-energized, the springs lift the valves or traps 95 in the reverse order, that is, the valve 95 is closed first and then the valve 97 is opened. The timing of the operation of the solenoid 100 can be made in such short intervals that it will produce a substantially constant flow of separated fines from the superfine classifier stage into the lower lane or duct 74 so as to prevent any pulsation in the flames of the burners 32 and 33 supplied with pulverized coal from the first stage of classification. In any case, no pulsation is likely to occur because of the length of the duct 76 and branch ducts 80 and 81.

The described and preferred operation of the valves 95 and 97 is by means of solenoid 100. This solenoid 100 may, however, be replaced by a compressed air piston, not shown, and operable by means of outside connected valves so as to produce the same motions effected by energizing and de-energizing the solenoid 100.

Furthermore, the system of valves 95 and 97, with their shaft 96 and enclosure 98, and solenoid 100 may be located outside of classifier 75, by means of a pipe starting at the lower opening of 92 and carried outside through 79, thus locating the system of returning the rejects from the second classifier mechanism to the mill and rendering better access to the valve system 95 and 97.

The hot air utilized in the installation shown in the drawings for drying the coal being pulverized in the pulverizers and for supplying the burners of the steam generator is derived from the air preheater 18 and conducted through the hot air duct 39 to a large manifold or air box 110, shown in Figs. 1 and 2, through which the burners 32 and 33 extend. This box 110 extends across the front of the steam generator and includes a compartment 111, shown in dotted lines in Fig. 2 surrounding each of the burners 32 and 33. These compartments are provided with control dampers for admitting the requisite proportion of secondary air from the box 110 into the furnace, but are not shown in the drawings because they are of a well-known type of construction. Similar compartments 112 surround the burner tubes 34, these compartments being connected directly into a part of the duct 39, as in Fig. 1. In fact, the duct 39 preferably includes two branches, respectively connected into the compartments 112 of the two burners 32 and into the opposite ends of the air box or manifold 110.

The installation preferably includes a fan for applying suction to the combustion gas outlet leaving the air preheater 18, this fan, not shown, being adapted to deliver the waste combustion gases to a stack, also not shown. While the fans or exhausters 78 and 84, together with the induced draft created by the burner tubes may be sufficient to draw the hot air through the air preheater 18, the installation advantageously includes a fan, not shown, for forcing air through the inlet 38 of the air preheater so that air is delivered into the air box 110 and the compartments 111 and 112 at a superatmospheric pressure. Furthermore, certain controls may be provided for balancing the draft applied by the exhaust fan for combustion gases against the pressure applied by the fan for introducing air through the duct 38 so that air delivered by the air preheater has a desired relatively constant high temperature. It will be understood that these operations will depend upon the load on the installation at a particular time.

The hot air delivered to the air box 110, to a considerable extent, is passed through the hot air ducts 73 and 73' to the rotary tube mills 68 and 68'. Under certain circumstances, as for example when the coal being ground contains considerable moisture, it is desirable to introduce fresh relatively dry hot air into the mixtures of pulverized coal and air being sent to the burners. Accordingly, a branch hot air duct 113 provided with an automatic control damper 114 bypasses fresh hot air from the duct 73 to the duct 76. A similar hot air duct 115 having an automatic control damper 116 is arranged to deliver hot air from the duct 73 into the duct 85. The bypass ducts 113 and 115 are provided respectively with automatically controlled cold air admission dampers 117 and 118 so that the air delivered through these ducts may have the desired temperature. For example, the temperature of the air and coal mixture in the duct 76 supplying burners 32 and 33 may be controlled by a suitable control means, including a temperature responsive element 119 connected through wiring 120 to a controller 121 which controls the cold air damper 117 in the pipe 113 through wiring 122 and suitable operative mechanism as shown. The controller 121 is set to provide a particular temperature in the mixture delivered through the duct 76. In a similar manner, a controller 123, Fig. 1, connected through wiring 124 to a temperature responsive element 125 on the duct 85 controls the temperature of the coal-air mixture delivered through this duct. In this instance, the controller 123 acts through wiring 126 to control the damper 118.

A further controller 127, responsive through wiring 128 to a temperature responsive element 129 located in the superheated steam line 41 is used to further control the burners 34, which in turn control the heating of the superheater 28 to produce superheated steam of the desired temperature. In this instance the controller 127 is connected through wiring 130 to the operating means for the secondary air dampers 131 of the burners 34 and also through wiring 132 to the control 116 on the proportion of air delivered through the duct 115. A further set of wires 133 leads from the controller 127 to the control of a hydraulic coupling 134, which controls the speed of the exhauster fan 84. The exhauster fan 84 is driven by a constant speed electric motor 135 through the hydraulic coupling 134 which is of a known type, the output of which is readily controlled by a known type of control means operated through the wires 133. Since the controller 127 is responsive to changes in the temperature indicated by the instrument 129 a slight drop in temperature of the superheated steam will cause the controller to increase the speed of the exhauster fan 84 to open the dampers 131 and the damper 116. If the temperature tends to rise too high, the reverse operations may be effected by the controller 127.

In addition to the above described controllers, the installation is provided with a master controller 136, responsive through a control lead 137, connected into the superheated steam header 31 to the pressure of the superheated steam delivered by the installation. The burners 32 and 33 must be controlled to provide the quantity of superheated steam demanded under varying load conditions and at the required pressure for properly operating the steam turbines of the installation. Accordingly, the master controller 136 is connected through wiring 137' and a branch set of wiring 138 with the operating means for the control damper 114 and by branch wiring 139 with the operating means 140 for a hydraulic coupling 141 to control the speed of the fan 78, which supplies a mixture of pulverized coal and air to the burners 32 and 33. The exhauster fan 78 is driven by a constant speed electric motor 142 through the coupling 141, the output of which is controlled in a known manner by the control operating means 140.

The master controller 136 is also made responsive to the inlet and outlet conditions of the stream of air flowing through the tube mill 68, the inlet and outlet being respectively connected to the master controller through lines 143 and 144. These lines are preferably pressure responsive lines which affect the controller 136 in addition to the effect applied by the pressure of the superheated steam in the header 31.

Under some circumstances the temperature of the hot fresh air delivered to the mill 68 through the duct 73 may be too high and accordingly fresh cool atmospheric air may be admitted to the duct at a position adjacent the mill by a control damper 145 operated by an operating means 146 connected to a controller 147 through wiring 148, the controller 147 being responsive to a temperature element 149 sensitive to the temperature of the air and pulverized coal stream leaving the mill through the duct 74. The element 149 is connected to the controller 147 through wiring 150.

An important feature of the control operation is associated with the control of the mills and more particularly the control of the coal level in the mill. This means the control of the supply of coal to the mill through the inlet 72. In this instance the mill 68, as shown in Fig. 1, is provided with a suction type level controller 151 of know character connected through tubing 152 with a controller 153, which operates through wiring 154 to control the speed of an electric motor 155 which drives the rotary feeder 71. As the demand for more steam increases, the speed of the blowers 78 and 84 is increased so that there is an increase in the rate of supply of pulverized coal to the steam generator. As the level of pulverized coal in the mill 68 tends to fall the controller 153 automatically, in response to the suction type level control 151, increases the speed of the disc feeder 71 so that the rate of coal supply to the mill is increased. The reverse occurs when the load on the installation falls off.

Other methods of controlling the level of coal in the pulverizers may be employed, for example, the level may be controlled by means based on the recording of the power input to the motor used for driving the pulverizer. The wattage or power consumption of the motor will rise starting where the mill is only loaded with the grinding balls. The wattage rises as the coal load increases and reaches a maximum when the coal fully covers the balls inside the mill. As the load in the mill continues to increase to the level of the charge of balls in the mill, wattage begins to decline due to the action of the pulverized coal as a lubricant for the balls. The wattage will also rise when the mill is overloaded with coal. Standard or known types of instruments acting on the principle of a wattmeter recorder, and responsive to variations in the power input or wattage of the mill motor may be used to proportionately vary the coal feeder for the mill and thereby maintain a preselected level for the coal in the mill. However, since the power input of the motor begins to decline when the level of the coal in the mill rises above that which is sufficient to cover the charge of balls in the mill, the suction tube previously mentioned is also installed and utilized in the mill. As soon as the level of the coal inside the pulverizer reaches the intake of the suction tube it causes a change in the suction detected by the tube and this action multiplied by a sensitive large bellows, causes, by the changes in the bellows a reduction in the feed of coal to the mill, even to the point of stopping the coal feeder. Once the feed to the mill is stopped, the continued pulverizing action of the mill causes the suction tube to break with the coal level and start the action of the suction recording mechanism, which change causes the starting of the fuel feeder at the point where it was cut off or stopped.

One additional instrument is shown in Fig. 1 of the drawings, that is, a mill air differential pressure gauge, shown at 155', the respective sides of which are connected by lines 156 and 157 with the inlet and outlet of the mill. This gauge is useful to the operator as an indication of the conditions in the mill and the drop in air pressure through the mill and as a check on the level controller.

In Fig. 1 of the drawings, it will be noted that the various controllers are connected into the different parts of the installation by full lines and by dot-and-dash lines, the full lines being the lines to which the controllers are responsive, while the dot-and-dash lines transmit the control operations effected by the controllers.

From the foregoing description, it will be seen that the firing of the generator with pulverized coal is effectively controlled and that more particularly the temperature and quantity of the superheated steam is accurately controlled so that it may be used directly in the high temperature and high pressure steam turbine for the production of electric power. An important part of the control resides in the use of superfine pulverized coal, which burns almost like natural gas, produced according to the invention and used exclusively in the burners 34, which effect the ultimate control of the temperature of the superheated steam produced in the superheater 28. Oil and gas, where they are available, can be used with the same results. In this connection it is to be understood that the means for operating the solenoid 100 of the classifier 75 may be located on the control panel with the other controls. It is furthermore to be understood that the means 83 for delivering coarse pulverized coal from the classifier 75 through the duct 82 may be and preferably is of the solenoid operated type used in the classifier itself.

What I claim is:

1. In a steam generator power installation including a steam boiler having a combustion chamber, a steam superheater, means for supplying heat to the steam superheater, and an air-swept tube mill for pulverizing coal for firing the boiler, means for conducting steam from the boiler to the superheater, means for feeding coal to the mill to be pulverized therein, means responsive to the rise and fall of the level of coal in the mill for respectively decreasing and increasing the rate of feed of the coal feeding means to maintain a reserve supply of pulverized coal in the mill, a burner means discharging into the combustion chamber for burning pulverized coal to heat the boiler, means for delivering a pulverized coal air mixture from the tube mill to said burner means, means responsive to an increase and decrease respectively in the demand for superheated steam delivered by the superheater for increasing and decreasing respectively coal-air mixture from the tube mill to said burner means, means defining a passageway for conducting combustion gases from the combustion chamber over the superheater for supplying the heat necessary to heat the steam in the superheater, means for augmenting the heat of said conducted combustion gases for heating steam in the superheater including a burner located adjacent the inlet of said passageway for burning pulverized coal, means for supplying a mixture of pulverized coal and air from the mill to said burner, and means responsive to the rise and fall of the temperature of the superheated steam delivered by the superheater for decreasing and increasing, respectively, the rate at which pulverized coal is supplied to said burner, whereby the temperature of the superheated steam delivered by the superheater is maintained substantially constant regardless of the variations in the demand for superheated steam.

2. A steam generator installation as claimed in claim 1, in which the means responsive to the rise and fall of the level of coal in the tube mill comprises means operatively associated with the means for feeding coal to the mill.

3. A steam generator installation as claimed in claim 1, in which the tube mill grinds the coal to a fineness of from about 85 to 95% through a 200 mesh screen, and means for applying a suction to the outlet of the mill for drawing a stream of pulverized coal and air from the mill.

4. A steam generator as claimed in claim 1, in which the steam superheater and burner for heating the steam superheater are located in positions with respect to each other and said passageway such that the steam superheater is not heated by radiant heat from the burner.

5. A steam generator installation as claimed in claim 1, in which the means for delivering the pulverized coal-air mixture to the burner means includes a plurality of exhauster fan means to deliver the mixture of pulverized coal and air to the burner means, means between the mill and exhauster fans for classifying the pulverized coal to more than one degree of fineness, and means for diverting classified portions respectively to the plurality of exhauster fan means.

6. A steam generator installation as claimed in claim 5, in which the exhauster fan means receiving the finest pulverized coal from the classifying means is connected into the burner located adjacent the inlet to said passageway.

7. A steam generator power installation as claimed in claim 1, including an electric motor drive for the means for feeding coal to the tube mill, the means responsive to the rise and fall of the level of coal in the tube mill comprising a combination suction type mill level control and a wattmeter-responsive control means connected to the said electric motor drive.

8. A steam generator power installation as claimed in claim 1, in which the means for delivering the pulverized coal-air mixture to the burner means includes an exhauster fan, the speed of which is responsive to the increase and decrease in the demand for superheated steam, and in which the means for supplying the mixture of pulverized coal and air from the mill to the burner located adjacent the inlet of said passageway includes a second exhauster fan means, the speed of which is responsive to the rise and fall of the temperature of the superheated steam delivered by the superheater.

References Cited in the file of this patent

UNITED STATES PATENTS

| | | |
|---|---|---|
| 1,732,009 | Gilbert | Oct. 15, 1929 |
| 1,759,452 | Hartmann et al. | May 20, 1930 |
| 2,033,185 | Dodd | Mar. 10, 1936 |
| 2,042,838 | Gibson | June 2, 1936 |
| 2,346,179 | Meyer et al. | Apr. 11, 1944 |
| 2,530,117 | Dickey | Nov. 14, 1950 |
| 2,586,510 | Bryant | Feb. 19, 1952 |
| 2,602,433 | Kuppenheimer | July 8, 1952 |
| 2,657,347 | Bristol | Oct. 27, 1953 |
| 2,685,280 | Blaskowski | Aug. 3, 1954 |
| 2,747,373 | Eggenberger et al. | Mar. 29, 1956 |

FOREIGN PATENTS

| | | |
|---|---|---|
| 258,589 | Great Britain | Mar. 3, 1927 |
| 266,320 | Great Britain | Sept. 29, 1927 |
| 310,975 | Great Britain | June 12, 1930 |
| 383,569 | Great Britain | Nov. 17, 1932 |
| 652,470 | Germany | Nov. 1, 1937 |

UNITED STATES PATENT OFFICE
CERTIFICATE OF CORRECTION

Patent No. 2,841,125

July 1, 1958

Fernando Falla

It is hereby certified that error appears in the printed specification of the above numbered patent requiring correction and that the said Letters Patent should read as corrected below.

Column 1, line 26, for "conversion" read -- conservation --; column 10, line 16, for "know" read -- known --; column 11, line 39, for coal-air mixture from the tube mill" read -- the supply of pulverized coal --.

Signed and sealed this 9th day of September 1958.

(SEAL)
Attest:

KARL H. AXLINE
Attesting Officer

ROBERT C. WATSON
Commissioner of Patents